United States Patent [19]

Maeda

[11] Patent Number: 4,691,900
[45] Date of Patent: Sep. 8, 1987

[54] METAL MELTING FURNACE

[75] Inventor: Isamu Maeda, Kanagawa, Japan

[73] Assignee: Kankyo Souken Consultant, Co., Ltd., Kanagawa, Japan

[21] Appl. No.: 896,764

[22] Filed: Aug. 14, 1986

[30] Foreign Application Priority Data

Aug. 23, 1985 [JP] Japan .............................. 60-185300

[51] Int. Cl.⁴ .............................................. C22B 1/00
[52] U.S. Cl. ..................................... 266/156; 266/87; 266/175; 266/901
[58] Field of Search ................. 266/87, 156, 159, 175, 266/901; 75/68 R

[56] References Cited

U.S. PATENT DOCUMENTS

| 2,788,204 | 4/1957 | Kalling et al. | 266/175 |
| 3,150,958 | 9/1964 | Collin et al. | 266/156 |
| 3,164,380 | 1/1965 | Kus | 266/175 |
| 3,809,378 | 5/1974 | Iida | 266/901 |
| 4,034,969 | 7/1977 | Grimes | 266/87 |

Primary Examiner—L. Dewayne Rutledge
Assistant Examiner—Robert L. McDowell
Attorney, Agent, or Firm—Toren, McGeady & Associates

[57] ABSTRACT

A metal melting furnace equipped with a preheating tower having a plurality of fork-shaped shelf-plates extending into the inside thereof, comprising a gas mixing chamber provided in the lower end portion of the tower, communicating with the upper portion of the melting furnace, a duct for circulating combustion exhaust gas from the top portion of the tower into the gas mixing chamber, a damper arranged in the duct for controlling the amount of the combustion exhaust gas circulated into the gas mixing chamber, and a plurality of nozzles connected to the duct and opening into the gas mixing chamber.

3 Claims, 7 Drawing Figures

METAL MELTING FURNACE

BACKGROUND OF THE INVENTION

1. Field of the Invention

This invention relates to a metal melting furnace equipped with a preheating tower which has shelf-plates and is arranged to have the material to be melted preheated with an exhaust gas within the preheating tower and more particularly to an arrangement for saving fork-shaped plates on which the melting material is to be placed within the preheating tower from quickly becoming unserviceable through wear and tear.

2. Description of the Prior Art

Aluminum metal melting furnaces are used for melting aluminum secondary alloys at aluminum die casting works, etc. Burners are used for melting. The melting process produces an exhaust gas at a very high temperature. It is known to utilize this high temperature exhaust gas for preheating the melting material. An example of this arrangement has been disclosed in Japanese Patent Publication No. SHO 58-30520 (Japanese Laid-Open Patent Application No. SHO 56-108092) entitled "Metal Melting Furnace with Preheating Tower". In the preheating tower of the metal melting furnace disclosed, there are provided a plurality of fork-shaped shelf-plates. The fork-shaped shelf-plates are inserted through two opposed side walls of the preheating tower into the inside thereof. The fore ends of the fork parts of the plates are thus arranged to abut on each other. The material which is placed on the fork parts under this condition is moved from one stage of plates to another by allowing it to drop off an upper stage of the plates down to a lower stage by moving the plates away from each other toward the opposed walls. Burners are ignited for the melting operation with a material such as ingots, scraps or the like placed on these shelf-plates.

After the aluminum material to be melted is heated within the main body of the metal melting furnace, a high temperature gas of the burners melts the material which has been preheated and placed on a dry hearth. An exhaust gas which has participated in melting on the dry hearth ascends from the shelf-plate disposed at the bottom of the preheating tower through the inside thereof before it is discharged from the upper part of the tower into the atmosphere. The preheating operation is carried out by heating the ingots or scraps on the shelf-plates with the exhaust gas during the process of its ascent.

During the melting operation, the molten aluminum must be kept at a high degree of temperature between 700° and 750° C. To meet this requirement, a high temperature combustion gas of 1200° C. obtained by burning the burners are blown at the surface of the molten metal to raise the temperature thereof. An exhaust gas resulting from this process is applied to the melting material on the dry hearth to melt it at the bottom of the preheating tower. Following that, a preheating process is carried out by allowing the exhaust gas to acend the preheating tower. During the preheating process, the temperature of the exhaust gas gradually cools off until it becomes a low temperature gas. The low temperature gas is discharged into the atmosphere from the upper end opening of the preheating tower.

The combustion exhaust gas is thus used for melting and preheating the material. In melting, the gas must be at a sufficiently high temperature. The exhaust gas, the temperature of which is slightly lowered through the melting process, is required to remain at a sufficient degree of temperature for preheating without melting the material placed on the shelf-plates for preheating. For this purpose, temperature is measured at suitable parts of the preheating tower such as bottom and upper parts of the tower and the burner combustion is controlled according to the result of the measurement.

Normally, the exhaust gas after melting on the dry hearth is at temperature between 800° and 900° C. when it reaches the lowest shelf-plate of the preheating tower. After preheating, the exhaust gas is at temperature between 200° and 250° C. when it is discharged from the upper part of the preheating tower.

The shelf-plates made of carbon steel in general are burnt and damaged through exposure to the high temperature exhaust gas over a long period of time. In the event of any burnt damage occurring during the melting operation, the material such as ingots or scraps cannot be kept in place any longer. The material then falls on the dry hearth located at the bottom of the preheating tower without having been sufficiently preheated. The insufficient preheating causes an increase in the length of time required for melting. As a result, melting efficiency drops. The melting capacity lowers. The produced amount of molten metal decreases. An adequate casting operation then might eventually become impossible. To prevent such a burnt damage of the shelf-plates, it is conceivable to use heat resisting steel in place of the carbon steel. However, in cases where small pieces of scraps are mixed in the material, the small pieces tend to melt on the shelf-plates before larger pieces of the material are adequately preheated, because the exhaust gas flowing to the lowest shelf-plate is at a high degree of temperature between 800° and 900° C. The molten aluminum material then reacts with the heat resisting steel which is forming the shelf-plates. In that case, the plates are eroded by this reaction until they are damaged to about the same degree as in the case of carbon steel. The service life of the fork-shaped shelf-plates is not only affected by the temperature but also affected by the size and the kind of the material to be preheated. Therefore, for stable operation of the shelf-plate type preheating tower, it is necessary to make some arrangement to prevent the shelf-plate from being exposed to an excessively high temperature and to prevent the aluminum melting material from melting on the plates.

Let us first consider a temperature condition for preventing the aluminum material from melting on the lowest shelf-plates. Such temperature is about 500° to 650° C. although it depends on the kind and shape of the material and a period of time for which the material is to be kept on the shelf-plates. To arrange the lowest plate passing temperature of the exhaust gas to be within the above-stated range, it is conceivable to forcedly cool the exhaust gas by means of a heat exchanger or to have a low temperature external air mixed therewith as a cooling medium. However, the forced cooling necessitates additional facilities such as a heat exchanger, etc. and is not recommendable in terms of energy saving. As for mixing a low temperature external air as a cooling medium for reducing the temperature not only results in a loss of energy but also accelerates exidation of the aluminum material preheated by a mixed gas obtained after a large amount of oxygen of air is mixed in the exhaust gas. As a result, the aluminum would be oxidated and consumed thereby. The latter method is, therefore, not recommendable in terms of resource saving.

SUMMARY OF THE INVENTION

In view of this problem, it is an object of this invention to provide a metal melting furnace wherein a portion of a combustion exhaust gas which is at a low temperature and does not include oxygen is taken out from the top of a preheating tower and is mixed with a high temperature combustion exhaust gas to make the latter into a gas of a suitable degree of temperature; and the suitable temperature gas thus obtained is used for preheating the material placed on the shelf-plates of the preheating tower, so that consumption of the material due to oxidation can be prevented and the heat loss of the exhaust gas for preheating can be prevented by virtue of the circulatory utilization of a portion of the exhaust gas.

DETAILED DESCRIPTION OF THE INVENTION

Figure 1:
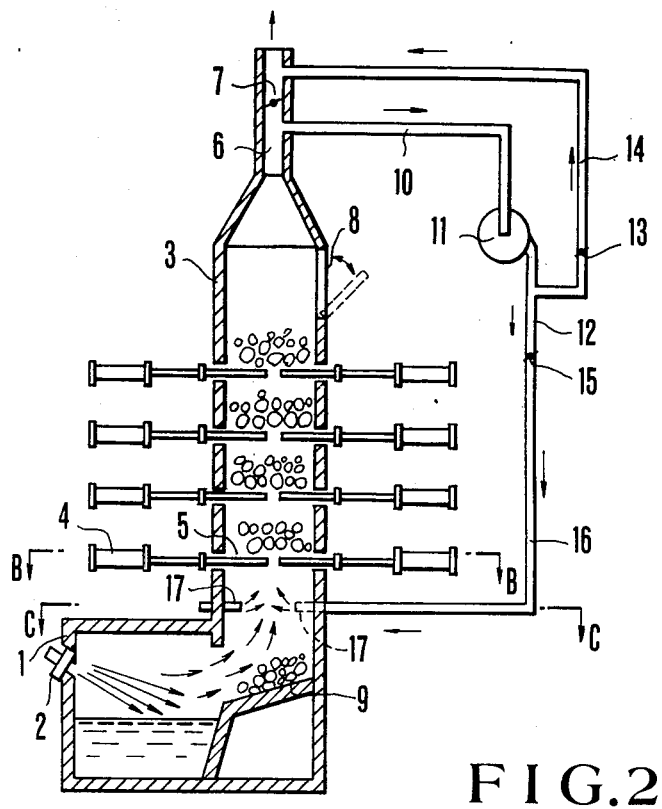
FIG. 1 is a sectional view of an embodiment of this invention.

The details of this invention will become apparent from the following description of an embodiment thereof taken in connection with the accompanying drawings, wherein:

FIG. 1 is a sectional view showing a body 1 of a metal melting furnace the shell of which is made of iron and is formed in a square or rectangular shape with the inner sides thereof formed by a refractory material; a burner 2 which is mounted on one side of the furnace body 1; and a preheating tower 3 which is erected at the end of the furnace body 1. The preheating tower 1 is formed in a square or rectangular horizontal sectional shape. The shell of the tower 3 is made of iron and is provided with a refractory lining on the inner sides thereof. The upper part of the tower 3 is made of either ordinary steel sheets or aluminum coated iron sheets. At the bottom part of the tower is provided a dry hearth 9 which is obliquely formed to open into the inside of the furnace body 1. The tower 3 is provided with fork-shaped plates 5. Each of the plates 5 has its fore end part thereof inserted into the inside of the tower through an opening provided in a side wall of the tower 3 and arranged to be opposed to and to come into contact with the fore end part of another plate 5 within the preheating tower. Each plate 5 is provided with a pneumatic cylinder 4 which is arranged to horizontally move the forked plate back and forth. An exhaust funnel 6 is mounted on top of the preheating tower 3. A damper 7 is provided at the outlet opening of the exhaust funnel 6. A charge port 8 is provided below the exhaust funnel 6. A suction tube 10 is arranged to pull out an exhaust gas having lowered temperature from the exhaust funnel 6. The suction tube 10 is connected to a blower 11. Meanwhile, a blowing tube 16 is connected via a sending tube 12 to the blower 11. A flow control damper 15 is interposed in between the tubes 12 and 16. The damper 15 cooperates with a thermocouple which is arranged to detect the temperature of a space existing below the lowest pair of plates within the preheating tower. The damper 15 and the thermocouple are arranged to control the flow of the lowered temperature exhaust gas which is being blown in in such a way as to automatically keep the above-stated space at a given temperature.

The damper is controlled by a known method. Thus the opening of the damper is controlled by a servo-motor (not shown) which is actuated by a signal produced when the temperature in the space is beyond or below a predetermined temperature set in a thermostat (not shown). The damper 7 is also controlled by a known method.

Figure 2:
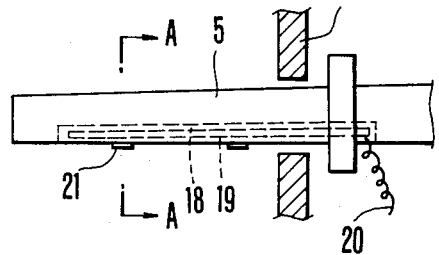
FIG. 2 is an illustration of a manner in which a thermocouple 19 is mounted on a fork part 5.
Figure 3:
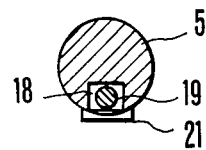
FIG. 3 is a sectional view taken along a line A—A of FIG. 2.
Figure 4:
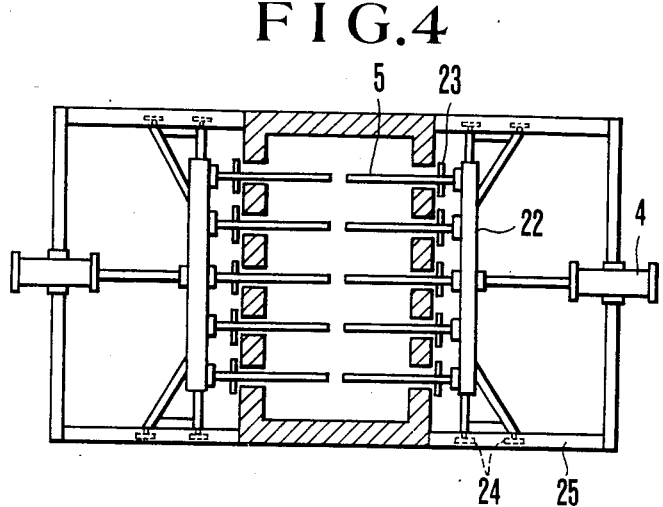
FIG. 4 is a sectional view of arrangement of fork parts 5 taken along a line B—B of FIG. 1.

The thermocouple must be installed within the preheating tower. However, if it is inserted from the side wall of the tower, it might be damaged by the material to be melted when the material falls off the plates. However, if the thermocouple is disposed on the surface of the side wall in such a position as to prevent it from being damaged by the falling material, the thermocouple would be incapable of accurately detecting the temperature of the mixed gas as it detects the temperature of only the gas in the vicinity of the side wall. In that event, the control operation of the damper 15 also cannot be accurately accomplished. To solve this problem, in accordance with this invention, the thermocouple 19 is attached with a fastening piece 21 to a groove 18 formed in the lower side of a fork part 5 of the shelfplate as shown in FIG. 2. This arrangement enables the thermocouple to accurately measure the temperature of the mixed gas without being damaged by the falling material. The thermocouple 19 in that position is exposed directly to the flow of the mixed gas. This, therefore, increases the accuracy of the temperature measurement for the control operation of the damper 15. FIG. 3 is a sectional view taken along a line A—A of FIG. 2. FIG. 4 is a cross-sectional view which is taken along a line B—B of FIG. 1 and shows the details of the fork-shaped arrangement of the shelf-plates 5.

Further, the exhaust tube 14 is arranged to connect the blower 11 to the outlet side of the exhaust funnel 6 via a furnace pressure control damper 13. The damper 13 is connected to a pressure gage for detecting the internal pressure of the furnace. The damper 13 is opened and closed to automatically adjust the amount of the exhaust gas in such a way as to keep the internal pressure of the furnace unvarying.

Figure 5:
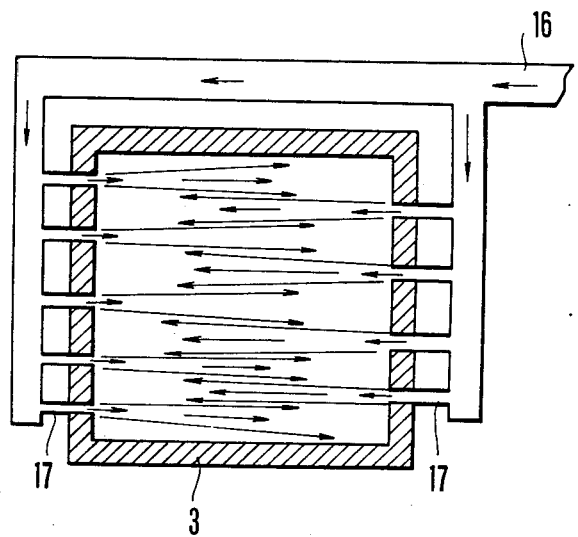
FIG. 5 is a sectional view of the details of nozzles 17 taken along a line C—C of FIG. 1.

The blowing tube 16 is connected to nozzles 17. The details of the arrangement of the nozzles 17 are as shown in FIG. 5. The nozzles 17 are approximately horizontally arranged piercing the opposed side walls in the lower part of the preheating tower. To have the lowered temperature gas or cooled exhaust gas which is blown out from these nozzles 17 effectively and perfectly mixed with a hot exhaust gas which ascends from the surface of the dry hearth, these opposed nozzles are arranged to blow out the cooled gas alternately on a horizontal plane in such a way as to completely cover the horizontal plane with the flow of the gas blown out, so that the high temperature gas or hot exhaust gas ascending from below can be uniformly mixed with the cooled gas to give a mixed gas of a predetermined temperature. For this purpose, there is provided a suitable mixing space in between the nozzle arrangement and the lowest fork-shaped shelf-plates. Further, to prevent the cooled or lower temperature gas from coming into contact with the preheated material on the dry hearth, there is provided a suitable space above the dry hearth, because: If the lower temperature gas is allowed to come into contact with the material on the dry hearth, the material melting efficiency would lower with the preheated material cooled by the lower temperature gas. Further, to prevent the nozzles 17 from being damaged by the falling material, these nozzles 17 are disposed within the inner refractory walls of the preheating tower with their fore ends arranged to be substantially flush with the surfaces of these walls.

Figure 6:
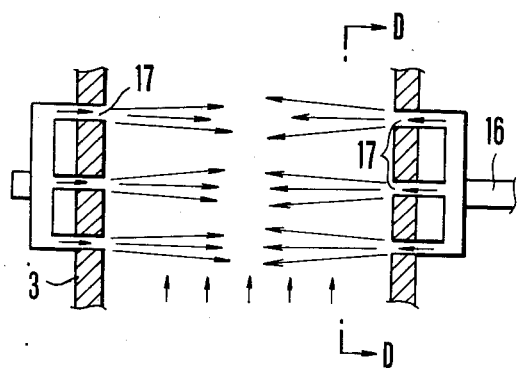
FIG. 6 is a sectional view showing multi-stage arrangement of the nozzles 17.
Figure 7:
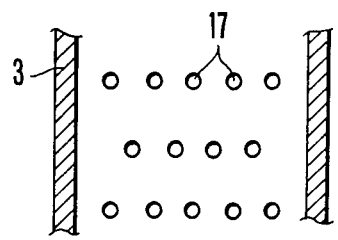
FIG. 7 is a sectional view taken along a line D—D of FIG. 6.

FIG. 6 shows in a sectional view a modification of the embodiment. In this case, the plurality of nozzles 17 are arranged in a plurality of stages. This modification is advantageous in cases where the gas mixing operation cannot be throughly accomplished with the single-stage nozzle arrangement made as shown in FIG. 1. FIG. 7 shows another modification in a sectional view taken along a line D—D of FIG. 6. In that case, the upper and lower nozzles are alternately arranged.

The material to be melted is supplied from the charge port 8 onto the uppermost fork-shaped shelf-plates. After that, the pneumatic cylinders 4 are operated to pull the fork-shaped plates toward the outside. The material to be melted is thus moved downward or dropped from an upper stage to a lower stage one after another until it reaches the surface of the dry hearth 9. With the material allowed to fall onto the lower fork-shaped plates, the cylinders 4 insert the uppermost fork-shaped plates to bring them into a position to be able to receive the material again. When the material is thus placed on the dry hearth through the above-stated process after it is supplied from the charge port 8, the burner 2 is ignited. A combustion exhaust gas from the burner heats and melts the material on the dry hearth. The exhaust gas comes to the lower space of the preheating tower. The gas reaches the lowermost shelf-plates through this space. Then, the gas comes to heat the material on the plates while passing through the material. In this manner, the material on each stage of the shelf-plates is heated by the ascending exhaust gas one after another until the gas reaches the exhaust funnel 6. The hot exhaust gas gradually cools down during its ascent through these shelf-plates.

After heating the material at the dry hearth, the exhaust gas still remains at a high temperature between 800° and 900° C. As mentioned in the foregoing, the fork-shaped shelf-plates might be burnt and damaged if this hot gas is allowed to pass through the lowermost plates and the material placed thereon. Besides, if the material is in the form of small pieces, the material might fuse to damage the fork parts of the plates. To prevent this, the cooled exhaust gas which has reached the exhaust pipe 6 is sucked from the funnel 6 by the blower 11 and is blown out from the nozzles 17 into the space below the lowermost shelf-plates before arrival of the hot exhaust gas there. Then, the hot gas comes to be completely mixed with the cooled or lower temperature gas. The damper 15 is operated to automatically keep the mixed gas at a predetermined temperature between 550° and 650° C.

The combustion exhaust gas, the temperature of which is thus adjusted to be between 550° and 650° C., ascends preheating the material placed on the shelf-plates one after another until it reaches the exhaust funnel 6. Then, a portion of the exhaust gas circulated for blowing in while the rest is discharged into the atmosphere via the damper 13. The damper 13 is operated to adjust the amount of the exhaust gas to keep the internal pressure of the furnace unvarying in response to the pressure gage which is arranged to measure the internal pressure of the furnace.

With the temperature measuring thermocouple and the lower temperature exhaust gas blowing-in arrangement appositely arranged in the manner as described in the foregoing, the preheating tower is capable of stably preheating the material without wear and tear of the shelf-plates thereof. The material melting efficiency can be enhanced by the preheating arrangement. It has been proven that, in accordance with this invention, the loss of the material due to oxidation can be reduced to an extremely low rate not exceeding 1%. Further, since the temperature is stably reduced at every stage of the shelf-plates, the upper part of the preheating tower can be simply made of iron sheets without any refractory lining.

Therefore, unlike the preheating tower of the conventional type having a refractory lining, the side walls of the tower is never damaged by the dropping movement of the material.

What is claimed is:

1. A metal melting furnace equipped with a preheating tower having a plurality of fork-shaped shelfplates extending into the inside thereof, comprising:
    a gas mixing chamber provided in the lower end portion of the tower, communicating with the upper portion of the melting furnace,
    a duct for circulating combustion exhaust gas from the top portion of the tower into the gas mixing chamber,
    a damper arranged in the duct for controlling the amount of the combustion exhaust gas circulated into the gas mixing chamber, and
    a plurality of nozzles connected to the duct and opening into the gas mixing chamber.

2. A metal melting furnace according to claim 1, which further comprises temperature detecting means for detecting the temperature within the gas mixing chamber.

3. A metal melting furnace according to claim 2, in which the damper controls the amount of the combustion exhaust gas circulated into the gas mixing chamber on the basis of the temperature detected by the temperature detecting means.

* * * * *